United States Patent [19]

Wakahara

[11] 3,908,882
[45] Sept. 30, 1975

[54] ELECTROMAGNETICALLY CONTROLLED FILM TRANSPORT DEVICE

[75] Inventor: Shigeo Wakahara, Yokohama, Japan

[73] Assignee: Nippon Kogaku K.K., Tokyo, Japan

[22] Filed: Aug. 13, 1974

[21] Appl. No.: 496,987

[30] Foreign Application Priority Data
Aug. 18, 1973  Japan.............................. 48-92098
Aug. 24, 1973  Japan.............................. 48-94273
Aug. 24, 1973  Japan.............................. 48-94274

[52] U.S. Cl. .................... 226/67; 226/70; 352/194
[51] Int. Cl.² ........................................... G03B 1/22
[58] Field of Search ............ 226/62, 63, 67, 68, 70, 226/71, 72, 73; 352/194–196, 169

[56] References Cited
UNITED STATES PATENTS
3,165,251  1/1965  Gerlach ................................ 226/63
3,637,125  1/1972  Freudenschuss ..................... 226/62

Primary Examiner—Richard A. Schacher
Attorney, Agent, or Firm—Shapiro and Shapiro

[57] ABSTRACT

An electromagnetically controlled film transport device comprises a film transport member having one end forming a claw portion engageable with a film perforation. The film transport member is reciprocable in a film transport direction and movable to bring its claw portion into and out of a film perforation. The film transport member is normally biased out of engagement with the perforation by a resilient member. A pivotable member is provided which is adapted to assume a first position in the film transport direction and to assume a second position in the opposite direction. An electromagnet is provided and has a field member provided on one of the transport and pivotable members for attracting an attractable piece provided on the other of the two members. When energized, the electromagnet is effective to unite the two members together to transmit the movement of the pivotable member to the transport member so as to bring the claw portion into and out of the film perforation. The device further comprises switching means for connecting the electromagnet to an electrical power source to energize the magnet, and a phase switch parallel-connected to the switching means. The phase switch is adapted to be closed as long as the transport member is engaged with the perforation.

7 Claims, 15 Drawing Figures

ELECTROMAGNETICALLY CONTROLLED FILM TRANSPORT DEVICE

BACKGROUND OF THE INVENTION

1. Field of the Invention

This invention relates to an electromagnetically controlled film transport device.

2. Description of the Prior Art

In order that the period of the film transport effected by a film transport claw may be varied over a wide range, it is known to use an electromagnet to move the film transport claw into and out of film perforation (feeding aperture) and to use a cam means to move the film transport claw in the film transport direction. However, this has suffered from a serious disadvantage that great noises are produced from the impacts occurring between the film transport claw and a stopper for limiting the range of movement of the transport claw into and out of film perforation. Also, a predetermined time relationship has been required between the operation of the electromagnet and the movement imparted by the cam means, and such requirement has so far been met as by providing a multi-stage rotary switch mechanism operable to open and close in synchronism with the cam means and changing over the switch mechanism to vary the opening-closing cycle, or by controlling the power supply to the electromagnet by means of a logic circuit such as an AND gate or the like which uses as the signal source a pulse from a variable frequency pulse generator and a pulse from a timing detector switch provided in said cam means.

Any of these methods has involved mechanically or electrically complicated construction.

Further, in the conventional projectors wherein the film transport in the forward and the reverse direction is effected by a common film transport claw, the change-over between the forward and the reverse direction has been effected by changing the direction of rotation of a transport claw drive motor. However, changing the direction of rotation of the drive motor has required the motor to be temporarily stopped from rotating and thus, rapid change-over between the forward and the reverse direction has been impossible.

SUMMARY OF THE INVENTION

It is a primary object of the present invention to provide a film transport device which produces no impact noise of the described kind and in which the time relationship between the movement of the film transport claw imparted by the cam means and the movement of the transport claw into and out of film perforation imparted by the electromagnet may be set up by a mechanically and electrically simple construction to thereby vary the film transport period over a wide range.

It is another object of the present invention to provide a film transport device which is capable of accurately effecting one-frame feed of the film in response to each pulse signal from outside.

It is still another object of the present invention to provide a film transport device which is capable of changing the film transport direction in a very short time.

To achieve these objects, the film transport device according to the present invention comprises a film transport member having at one end thereof a claw portion engageable with a film perforation. The film transport member is reciprocally movable in a film transport direction to transport a film and movable between a position in which the claw portion is engaged with a film perforation and a position in which the claw portion is retracted from the film perforation. The film transport member is biased to said latter position by a resilient member. The device further comprises a pivotable member adapted to assume a first position in the direction in which the transport member transports the film and to assume a second position in the direction opposite to the film transport direction. An electromagnet is provided which has a field member provided on one end of the transport member and the pivotable member for attracting an attractable piece provided on the other of the two members. The electromagnet, when energized, unites the two members together by its attraction to transmit the movement of the pivotable member to the transport member so as to cause the transport member to be moved into and out of engagement with the perforation. The transport member is in engagement with the perforation when the pivotable member is in its first position as long as the transport and pivotable members are united together by the attraction of the electromagnet. The transport member is retracted from the perforation when the pivotable member is in its second position. The device further comprises switching means for connecting the electromagnet to an electrical power source to energize the electromagnet, and a phase switch parallel-connected to the switching means and adapted to be closed as long as the transport member is in engagement with the perforation.

Other object and features of the present invention will become fully apparent from the following detailed description of some specific embodiments thereof taken in conjunction with the accompanying drawings.

DESCRIPTION OF THE PREFERRED EMBODIMENTS

Figure 1:
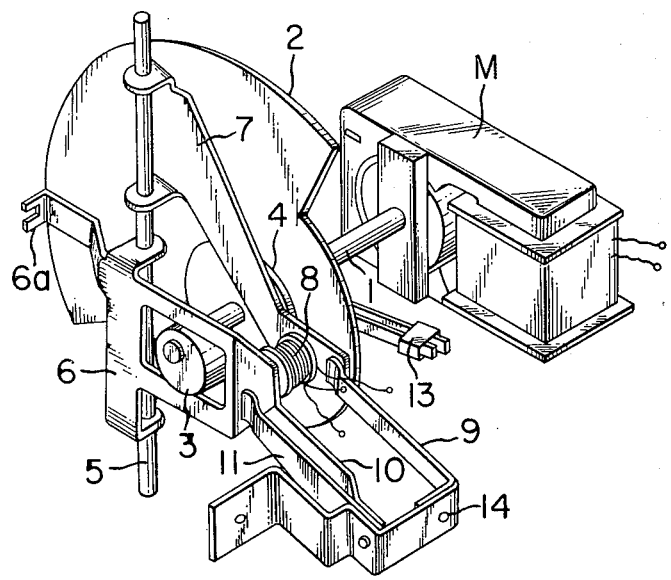
FIG. 1 is a perspective view showing a first embodiment of the film transport device according to the present invention.
Figure 2:
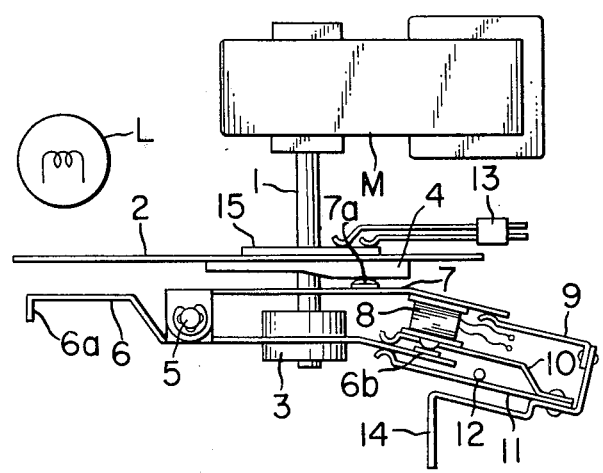
FIG. 2 is a plan view of the film transport device in FIG. 1.
Figure 3:
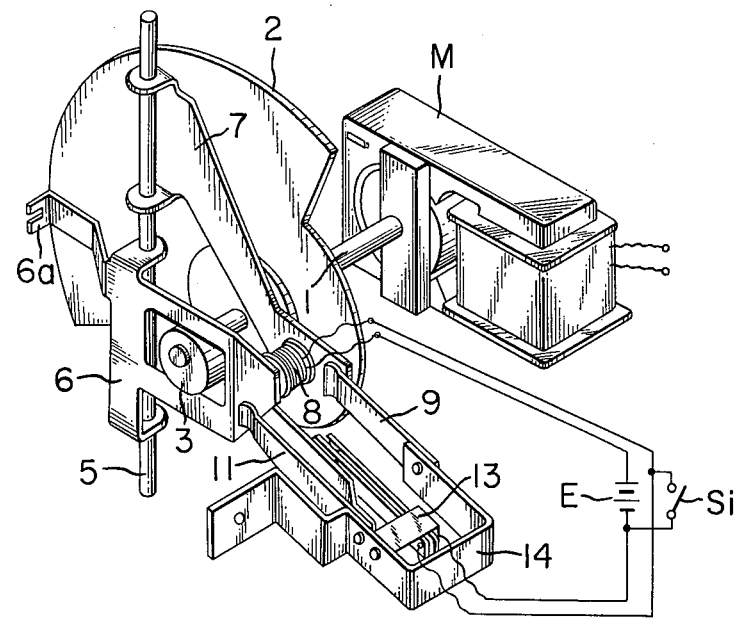
FIG. 3 is a perspective view showing a second embodiment of the film transport device according to the present invention.

Referring to FIGS. 1 and 2, there is shown a first embodiment of the present invention. It includes a projection lamp $L$, a motor M having a shaft 1, a shutter 2, an eccentric cam 3, and a face cam 4 having a cam surface in one end face. These members 2, 3 and 4 are integrally mounted for rotation on the motor shaft 1. There is further seen a stationary shaft 5 and a film transport claw 6. The film transport claw has at one end thereof a claw 6a for engagement with film perforation (not shown) and at the other end 6b a soft iron piece to be attracted by an electromagnet 8, which will further be described. The film transport claw 6 is slidably and pivotally mounted on the stationary shaft 5 and engaged with the eccentric cam 3 so that reciprocal movement in the film transport direction is transmitted to the claw 6 in synchronism with rotation of the shutter 2. A pivotable lever 7 is pivotally mounted on the stationary shaft 5 and has a contact 7a provided in a portion thereof, which contact is engageable with the face cam 4. An electromagnet 8 is mounted on the pivotable lever 7, and a plate spring 9 is provided to bias the contact 7a of the pivotable lever 7 into engagement with the face cam 4. The pivotal movement of the pivotable lever 7 imparted by the face cam 4 and the plate spring 9 has a predetermined relationship with the reciprocal movement of the film transport claw 6 imparted in the film transport direction by the eccentric cam 3. More specifically, the cam surfaces of the eccentric cam 3 and the face cam 4 are positioned such that, when said pivotal movement has been transmitted as the movement of the film transport claw 6 into and out of a film perforation, the film transport claw effects a so-called rectangular movement. There are further provided plate springs 10 and 11. The plate spring 10 normally biases the iron piece on one end 6b of the film transport claw 6 in the direction to prevent the iron piece from being attracted by the electromagnet 8. The plate spring 11 cooperates with a pin 12 to limit the position of the film transport claw 6 during its non-engagement with a perforation, and the plate spring 11 and the pin 12 come into contact with each other when the electromagnet 8 has attracted thereto the iron piece on the film transport claw 6. A plate member 14 holds the above-described springs 9, 10 and 11. A leaf contact 13 and a phase switch plate 15 are provided to constitute a switch for detecting the phase of the shutter.

Operation of the above-described arrangement will now be explained. When the electromagnet 8 is energized with the motor shaft 1 being rotated, the film transport claw 6 will have the soft iron piece on the end 6b attracted to the electromagnet 8 and in such position, movement into and out of a film perforation will be transmitted to the claw portion 6a of the film transport claw 6 by pivotal movement of the pivotable lever 7, irrespective of the biasing force of the plate spring 10, and together with the reciprocal movement imparted in the film transport direction by the eccentric cam 3, this will cause a so-called rectangular movement of the film transport claw 6 to take place per rotation of the shutter 2, thus feeding the film intermittently frame by frame. Conversely, when the electromagnet 8 is deenergized, it will lose its attraction and transmission of the pivotal movement of the pivotable lever 7 to the film transport claw 6 will be prevented by the action of the plate spring 10, so that the claw 6a will be held at its position retracted from a film perforation and thus, the period of film transport may be varied by controlling the energization of the electromagnet 8. Also, the time for deenergization of the electromagnet 8 can be determined by the phase switch 13, 15 and therefore, by presetting the phase switch 13, 15 so as to permit energization of the electromagnet 8 during engagement of the recessed portion of the face cam 4 with the contact 7a, the time for deenergization of the electromagnet 8 will be the time for disengagement of the film transport claw 6 from a perforation and the claw 6 will never be retracted from a perforation during film transport operation. When retracted from a film perforation, the film transport claw 6 will impact the plate spring 11, but the shock resulting from such impact and accordingly, the sound produced by the shock, will be reduced by providing a gentle slope in the face cam 4 or by attaching rubber or like material to the plate spring 11.

The phase switch 13, 15 may be replaced by a switch adapted to open and close in accordance with the pivoted position of the pivotable lever 7 or the plate spring 10. It will also be apparent that a plurality of shutter blades may be used.

Although, in the present embodiment, the film transport claw is directly attracted to the electromagnet 8, it is also possible to provide a member attractable by the electromagnet so that the film transport claw may be moved into and out of a perforation by such member.

FIGS. 3 to 7 show a second embodiment of the present invention. It includes a projection lamp L, a motor M having a shaft 1, a shutter 2, an eccentric cam 3, and a face cam 4 having a cam surface in one end face. These members 2, 3 and 4 are integrally mounted for rotation on the motor shaft 1. There is further seen a stationary shaft 5 and a film transport claw 6. The film transport claw has at one end thereof a claw 6a for engagement with film perforation (not shown) and at the other end 6b a soft iron piece attractable by an electromagnet 8, which will further be described. The film transport claw 6 is slidably and pivotally mounted on the fixed shaft 5 and engaged with the eccentric cam 3 so that reciprocal movement in the film transport direction is transmitted to the claw 6 in synchronism with rotation of the shutter 2.

A pivotable lever 7 is pivotally mounted on the stationary shaft 5 and has a contact 7a studded in a portion thereof, which contact is engageable with the face cam 4. An electromagnet 8 is mounted on the pivotable lever 7 and connected in series with an electrical power source E and a manually operable switch Si. A plate spring 9 is provided to bias the contact 7a of the pivotable lever 7 into engagement with the face cam 4 to pivotally move the pivotable lever 7.

The pivotal movement of the pivotable lever 7 imparted by the face cam 4 and the plate spring 9 has a predetermined relationship with the reciprocal movement of the film transport claw 6 imparted in the film transport direction by the eccentric cam 3. More specifically, the cam surfaces of the eccentric cam 3 and the face cam 4 are positioned such that, when said pivotal movement has been transmitted as the movement of the film transport claw 6 into and out of a film perforation, the film transport claw effects a rectangular movement. There are further provided plate springs 10 and 11. The plate spring 10 normally biases the iron piece on one end 6b of the film transport claw 6 in the direction to prevent the iron piece from being attracted by the electromagnet is weaker than the moment of the holding force of the plate spring 10 when the electromagnet is energized in a position where the contact 7a of the pivotable lever 7 is in engagement with the recessed portion of the face cam 4, i.e. in the position of the pivotable lever 7 for bringing the claw portion of the film transport claw into engagement with a perforation (in such position, the distance between the electromagnet body or field member and the attractable piece on the film transport claw is represented by $d_1$), and the attraction of the electromagnet is stronger than the moment of the holding force of the plate spring 10 when the electromagnet is energized in a position where the contact 7a of the pivotable lever 7 is in engagement with the protruded position of the face cam 4, i.e. in the position of the pivotable lever for bringing the claw portion of the film transport claw out of engagement with a perforation (in such position, the distance between the electromagnet body or field member and the film transport claw is represented by $d_2$). This can simply be realized by utilizing the fact that a greater distance from the electromagnet to the attractable piece results in a weaker attraction. Further, once the iron piece has been attracted to the electromagnet, the attracted condition may be maintained irrespective of the position of the pivotable lever.

The plate spring 11 cooperates with a pin 12 to limit the position of the film transport claw 6 during its nonengagement with a perforation, and the plate spring 11 and the pin 12 come into contact with each other when the electromagnet 8 has attracted thereto the end 6b of the film transport claw 6.

A plate member 14 holds the above-described springs 9, 10 and 11.

A phase switch 14 is adapted to be closed only when the film transport claw has come into a perforation, and is connected in series with the previously described manually operable switch Si. Thus, the power source, the electromagnet and the phase switch together constitute a closed circuit.

The phase switch, the manually operable switch Si parallel-connected thereto, the electromagnet and the power source together constitute an electromagnetic circuit.

Figure 9:
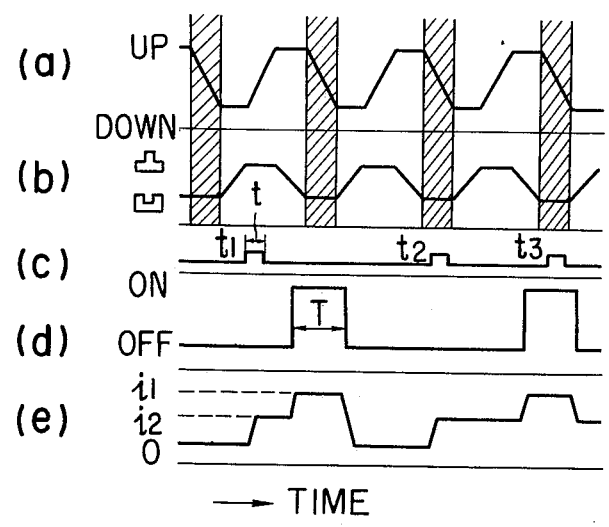
FIG. 9 is a view for explaining the time relationship in operation between respective components in FIG. 8.

FIG. 9a illustrates up and down movement of the film transport claw, as viewed in FIG. 1. FIG. 9b depicts the movement of the pivotable lever, wherein the mark ⌐¬ indicates the position in which the lever is engaged with the protruded portion of the face cam and the mark⌐¬ indicates the position in which the lever is engaged with the recessed portion of the face cam. Both in FIGS. 9a and 9b, the abscissa represents time. When transmitted to the film transport claw, the movements of the pivotable lever as indicated at ⌐¬ and ⌐¬ correspond to the movements of the transport claw out of and into a perforation, respectively, and thus one-frame transport occurs at the points of time shown by the slant lines in FIG. 9.

The film transport claw effects its movement in the film transport direction and its movement out of the film passage in superposed relationship with each other, and this is what is called the rectangular movement.

Operation of the second embodiment will now be described with reference to FIGS. 3 to 7.

Figure 4:
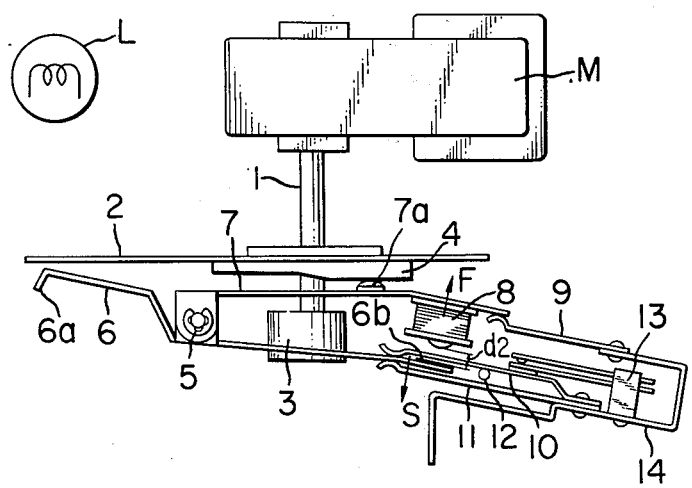
FIGS. 4 to 7 are plan views of the film transport device in FIG. 3.
Figure 5:
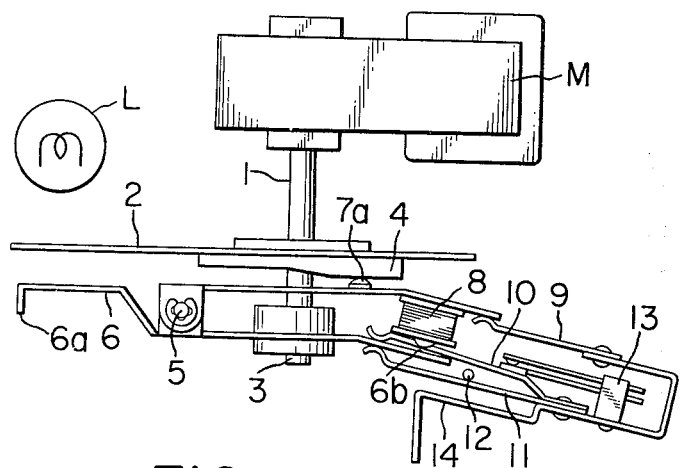
Figure 6:
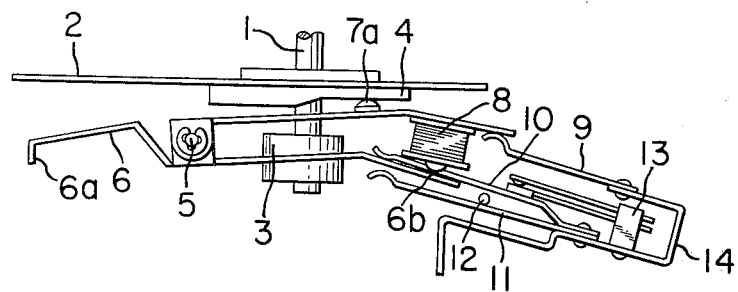

When the motor is rotating but the manually operable switch Si is open, there is no power supply to the electromagnet 8 and the end 6b of the film transport claw 6 cannot be attracted to the electromagnet 8, as is shown in FIG. 4, so that the claw 6a is held retracted from a film perforation without effecting the film transport. In the position of FIG. 4, i.e. the position where the pivotable lever is engaged with the protruded portion of the face cam, when the switch Si is closed to permit power supply to the electromagnet 8, the magnet whose attraction is then stronger than the biasing force of the plate spring 10 will attract thereto the end 6b of the film transport claw, as is shown in FIG. 5, and further, the face cam will be rotated to bring its recessed portion into engagement with the pivotable lever, as is shown in FIG. 6. Thereupon, the claw will be engaged in a perforation to feed the film by one frame with the engagement maintained between the recessed portion of the face cam and the pivotable lever. Then, there will again be brought about the position of FIG. 5 in which the pivotable lever engages the protruded portion of the face cam. In this manner, shift between the position of FIG. 5 and the position of FIG. 6 will recur as long as the switch Si is closed to permit power supply.

Figure 7:
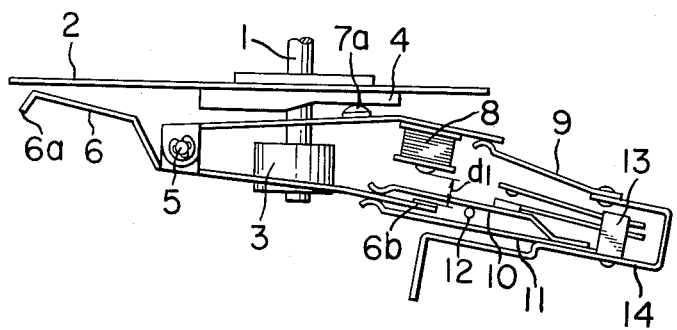

Next, in the position of FIG. 7, i.e. the position where the pivotable lever is engaged with the recessed portion of the face cam, when the switch Si is closed to permit power supply to the electromagnet 8, the magnet whose attraction is now weaker than the moment of holding force of the plate spring 10 cannot attract thereto the film transport claw in spite of the power supply to the magnet, and the electromagnet can attract the film transport claw only after the face cam has made a certain degree of angular rotation to bring its protruded portion into engagement with the pivotable lever, as is shown in FIG. 4.

Once the magnet has attracted the film transport claw, shift between the position of FIG. 5 and the position of FIG. 6 will recur and one-frame feeding occurs in the position of FIG. 6, as already described.

Thus, at whatever time the power supply through the manually operable switch Si may be initiated, the film transport will be initiated always at a predetermined position without occurrence of half-frame feeding or without the claw biting into any unperforated portion of the film. Further, even if the switch Si is opened during the film transport, the power supply to the electromagnet will never be cut off because the phase switch 13 is now closed, and the power supply is cut off only after the face cam has made a certain degree of angular rotation to open the phase switch. Therefore, at whatever time the power supply through the manually operable switch to the electromagnet is discontinued, the claw will never be retracted from a perforation during the film transport operation.

Operation for accomplishing one-frame feeding will now be described with reference to the drawings further including FIG. 8.

In this figure, reference characters E, 8 and 13 respectively designate the power source, the electromagnet and the phase switch which have all been described above. There is further shown a diode D1 for bypassing the counter electromotive force of the electromagnet 8 during its deenergization, inverse current blocking diodes D2 and D3, a resistor R1 and a thyrister SCR. A capacitor C and a resistor R5 are provided to protect the thyrister SCR. A portion G encircled by a dashed line and including the thyrister SCR constitutes a power supply holding circuit and is parallelconnected to the diodes D3 and to the phase switch 13. The power supply holding circuit G, the phase switch 13 and the electromagnet 8 together constitute an electromagnetic circuit.

A portion M encircled by a dashed line and including a transistor Tr, resistors R2, R3, R4 and a capacitor C1 constitutes a memory circuit. The transistor Tr may be turned on when the phase switch 13 is closed and there is no charging current flowing to the capacitor C1.

Figure 8:
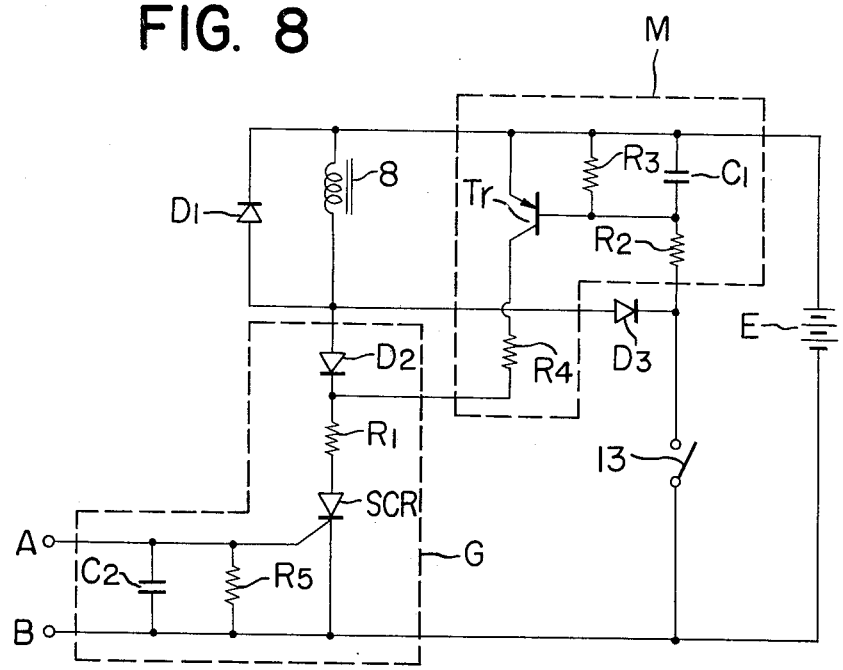
FIG. 8 is a circuit diagram showing another embodiment of the film transport device according to the present invention.

Operation of the FIG. 8 circuit when a pulse is applied thereto will now be considered.

When an input pulse enters at a point of time $t_1$ in FIG. 9c, the thyrister SCR will be turned on to permit a flow of current $i_2$ (see FIG. 9e) which is determined by the relationship among the resistance value of the electromagnet 8 and the resistor R1 and the DC source E. As the pivotable lever 7 is displaced from the protruded position to the recessed position, the attraction of the electromagnet 8 will cause the film transport claw 6 to follow the movement of the pivotable lever 7 and move into a film perforation. This results in closing of the phase switch 13, which will thus permit a flow of charging current to the capacitor C1 while the transistor Tr will remain in OFF state with no current flowing thereto and thus, the thyristor SCR will be turned on. However, since the phase switch 13 is closed, a current $i_1$ (see FIG. 9e) determined by the power source E and the internal resistance of the electromagnet 8 will continue to flow to the magnet. In the meantime, the film is transported by one frame and, when the pivotable lever 7 has moved toward the protruded position to open the phase switch, the power supply to the electromagnet 8 will be discontinued. Next, at a point of time $t_2$, i.e. when the film transport claw is moving downwardly, if a pulse is applied between A and B in FIG. 8, the thyrister SCR will be turned on to permit a flow of current $i_2$ to the electromagnet 8, but since the pivotable lever 7 now lies in the recessed position, the electromagnet cannot effect attraction when the lever 7 is on a slant line and, when the pivotable lever has come up to the protruded position, the magnet will begin to effect attraction and the film will be fed by one frame when the lever 7 lies on the next slant line.

Further, at a point of time $t_3$ in FIG. 9c, i.e. when the phase switch 13 is being closed and the film transport is occurring, if a pulse is applied, a base current will flow to the transistor to turn on the same. On the other hand, the thyrister SCR will also be turned on by a holding current which is a current flowing through the collector of the transistor and the resistors R1 and R4, so that upon opening of the phase switch a current $i_2$ will flow to the electromagnet to permit oone-frame feed to be effected from the time when the phase switch is again closed till it is re-opened.

In other words, the input pulse number and the number of frames fed are in accord with each other unless the sum of the period of the input pulse and the pulse duration time t is shorter than the period of up and down movement of the transport claw and the time T during which the phase switch 13 remains closed.

Although, in the present embodiment, the film transport claw is directly attracted to the electromagnet, it is also possible to provide a member attractable by the electromagnet 8 to force the film transport claw against the electromagnet.

Figure 10:
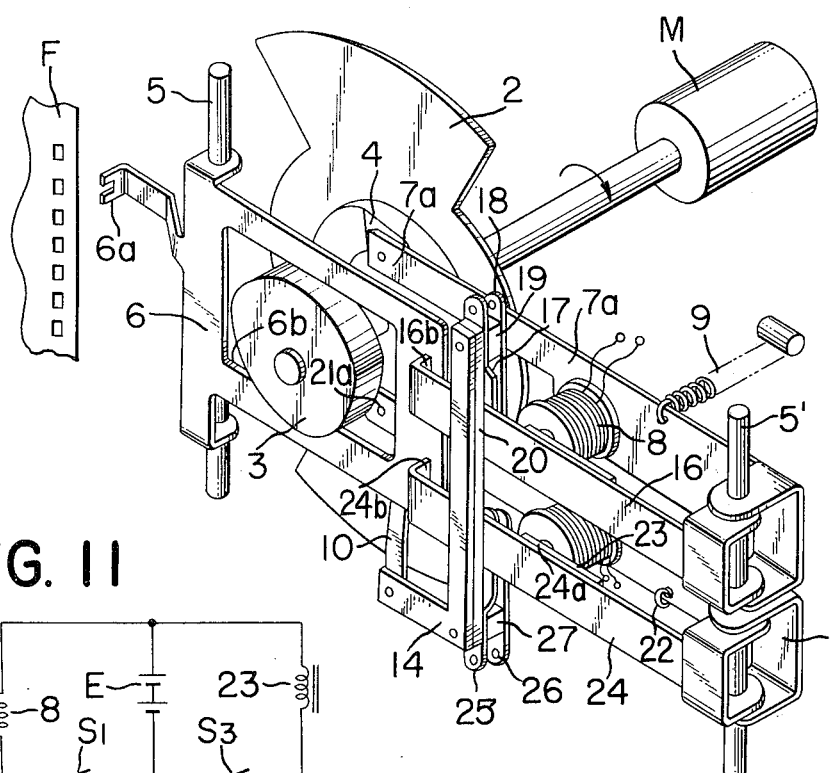
FIG. 10 is a perspective view showing a third embodiment of the film transport device according to the present invention.

FIG. 10 shows, in perspective view, a third embodiment of the present invention. It includes a projection lamp L, a drive motor M, a shutter shaft 1 driven from the motor M and securely mounting thereon a shutter 2 having a plurality of sectors, a vertically movable cam 3, and a face cam 4 provided with a protruded portion and a recessed portion.

A stationary shaft 5 is fixed to unshown projector body and rotatably and slidably supports a film transport member 6. The film transport member 6 has a film transport claw 6a engageable with a film perforation to transport the film and an engaging portion 6b engageable with the vertically movable cam 3 to serve as a follower.

The film transport member 6 effects a vertical reciprocal movement while the shutter 3 is being rotated by rotation of the vertically movable cam 3, which in turn is rotated by the shutter shaft, to intercept the light beam passed from the light source L to the film surface.

A plate spring 10 is engaged with the film transport member 6 to bias the same clockwise about the shaft 5, i.e. in a direction to retract the transport claw 6a from the film surface F.

Another stationary shaft 5' is fixed to unshown projector body and pivotally supports a pivotable plate 7.

The pivotable plate 7 has an end portion 7a engageable with the face cam 4.

A tension spring 9 biases the pivotable plate 7 so that the end portion 7a of the pivotable plate is always in contact with the face cam 4. The end portion 7a of the pivotable plate 7 is designed such that it is engaged with the recessed portion of the face cam when the transport member 6 is moving downwardly and that it is engaged with the protruded portion of the face cam when the transport member 6 is moving upwardly.

An electromagnet 8 is secured to the pivotable plate 7. A lever 16 is pivotably supported on the stationary shaft 5', and has an attractable piece 16a attractable by the electromagnet 8 and an engaging end portion 16b engageable with the film transport member 6.

A pair of electrically conductive plate springs 17 and 18 constitute a single switch S1 (FIG. 11) and are normally supported in non-contact relationship with each other by an insulator 19 and a support member 14.

A resilient material 20 such as rubber or the like is secured to the support member 14. One of the plate springs, 17, biases the lever 16 toward the resilient material 20.

The relationship between the plate springs 17, 18 and the electromagnet 8 will be described with reference to FIG. 11.

The pair of plate springs 17 and 18 constitute a first switch S1 which connects the electromagnet 8 to the electrical power source E. A second, manually operable switch S2 is parallel-connected to the first switch S1.

The first switch S1 is adapted to be closed only when the film transport claw 6a is engaged in a film perforation as will further be described.

A further pivotable plate 21, the end portion 21a thereof, a tension spring 22, an electromagnet 23, a lever 24, an attractable piece 24a, an engaging end portion 24b, a pair of plate springs 25 and 26 and an insulator 27 are similar to those described above and designated by 7, 7a, 9, 8, 16, 16a, 16b, 17, 18 and 19, respectively.

However, the end portion 21a is located at a position of the face cam 4 which is substantially diametrically opposite to the end portion 7a, so that the end portion 21a, conversely to the end portion 7a, is engageable with the recessed portion of the face cam 4 when the film transport member 6 is moving upwardly.

The face cam 4, the pivotable plate 7, the electromagnet 10, the lever 16 and the pair of plate springs 17 and 18 together constitute first drive means, and the face cam 4, the pivotable plate 21, the electromagnet 23, the lever 24 and the pair of plate springs 25 and 26 together constitute second drive means.

Figure 11:
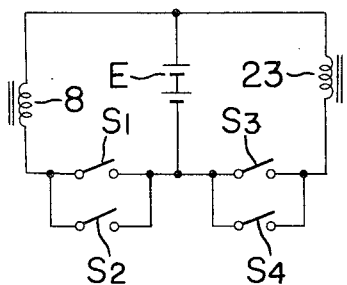
FIG. 11 is a feeder circuit diagram to electromagnet.

A further pair of plate springs 25 and 26 constitute a third switch S3 as shown in FIG. 11, and it is parallel-connected to a further manually operable, fourth switch S4. The first and the second drive means are closely similar in function and therefore, only the first drive means will hereinafter be described.

Figure 12:
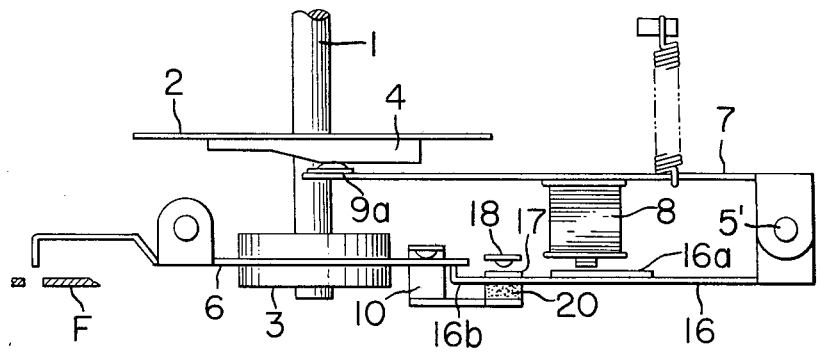
FIGS. 12 to 14 are partial explaining views of the embodiment of FIG. 10.

The inter-relationships among the face cam 4, the pivotable plate 7, the electromagnet 8, the lever 16 and the film transport member 6 will be explained with reference to FIGS. 12, 13 and 14. In FIG. 12 showing a position in which the end portion 7a of the pivotable member 7 is engaged with the protruded portion of the face cam 4, the electromagnet 8 and the attractable piece 16a are designed such that they are closely spaced apart or in contact with each other if there is no power supply from the power source E to the electromagnet 8.

The lever 16 is urged against the resilient material 20 by the biasing force of the plate spring 17 and the film transport member 6 is also biased clockwise into contact with the engaging portion 16b of the lever 16 by the plate spring 10, so that the film transport claw 6a is retracted without engaging the film F. Even if the electromagnet 8 is then energized to attract the attractable piece 16a thereto, the lever 16 will very little moved from the position of FIG. 12 and the film transport claw 6a will still remain spaced apart from the film surface F.

Thus, irrespective of energization of the electromagnet 8, the film transport claw 6a is retracted from the film surface F as long as the end portion 7a of the pivotable plate 7 is in engagement with the protruded portion of the face cam 4. Also, the first switch S1 comprising the pair of plate springs 17 and 18 remains open.

Figure 13:
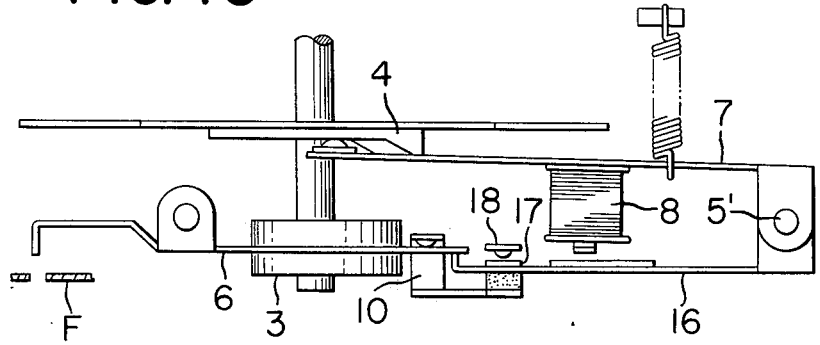

In FIG. 13 showing a position in which the engaging portion 7a is in engagement with the recessed portion of the face cam 4 without the electromagnet 8 being energized, there is a considerable air space between the electromagnet 8 and the attractable piece 16a, i.e. such an air space that even if the second switch S2 is closed to energize the electromagnet 8, the biasing force of the plate springs 10, 17 is sufficiently greater than the attraction of the electromagnet to prevent the attractable piece 16a from being attracted to the electromagnet 8. Thus, in such position, the film transport claw 6a is retracted from the film surface F and the switch S1 comprising the pair of plate springs 17,18 is open, so that even if the second switch S2 is then closed, the attractable piece 16a will never be attracted and the positions of the various members will remain unchanged.

Figure 14:
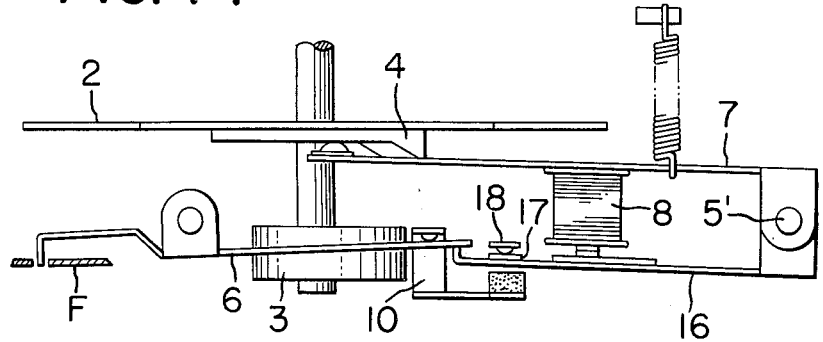

FIG. 14 will now be referred to.

In the position of FIG. 12, if the second switch S2 is closed to energize the electromagnet 8, the latter will attract the attractable piece 16a. Or, in the position of FIG. 13, if the second switch S2 is closed to energize the electromagnet 8, the attractable piece 16a will be attracted to the electromagnet 8 when the face cam 4 has been rotated to bring its protruded portion into engagement with the end portion 7a. After the attractable piece 16a has been so attracted, the face cam 4 will further be rotated to bring its recessed portion into engagement with the end portin 7a. Such position is shown in FIG. 14.

Since the lever 16 is now attracted to the electromagnet 8, it will be pivoted clockwise about the stationary shaft 5' against the force of the plate springs 10,17 and therefore, the plate spring 17 will come into contact with the plate spring 18, thus closing the first switch S1. Also, the film transport member 6 is pivoted counter-clockwise about the stationary shaft 5 by the engaging portion 16b of the lever 16 so that the film transport claw 6a is inserted into a perforation in the film F. Then, the vertically movable cam 3 moves the transport claw 6a downwardly as viewed in FIG. 10, thus transporting the film by one frame in the forward direction.

Thus, once the lever 16 has been attracted to the electromagnet 8, and as long as the end portion 7a is in engagement with the recessed portion of the face cam as shown in FIG. 14, the transport claw 6a is inserted in a perforation and driven downwardly as viewed in FIG. 10, thereby accomplishing one-frame feed of the film in the forward direction. Thereafter, when the engaging portion 7a comes into engagement with the protruded portion of the face cam due to the rotation of the shutter shaft, the transport claw 6a will be retracted from the film perforation and now moved upwardly as viewed in FIG. 10 (during that time, the film is stationary, of course). Thus, as long as the second switch S2 is closed, the above-described operation may be repeated to intermittently transport the film in the forward direction.

Next, operation of the first switch S1 will be described. If, as shown in FIG. 14, the manually operable, second switch S2 is opened during film transport, the power supply to the electromagnet 8 will be maintained because the first switch S1 remains closed. One-frame feed of the film is completed with the end portion 7a engaging the protruded portion of the face cam 4 and, when the pair of the plate springs 17 and 18 are disengaged from each other as shown in FIG. 12, the first switch S1 will be opened to cut off the power supply to the electromagnet.

Thus, even if the second switch S2 is opened during the film transport, the presence of the first switch ensures the film transport claw 6a to be retracted from a film perforation when one-frame feed of the film has been completed, without the claw being retracted from the perforation during the film transport.

With the above-described construction, in the position of FIG. 13, even if the second switch S2 is closed to energize the electromagnet, the lever 16 is not attracted and no film transport occurs but, only in the position of FIG. 12, the lever 16 is attracted to initiate the film transport. Therefore, at whatever time the second switch S2 may be closed, the film transport is initiated always at a predetermined position without the possibility that half-frame feed of the film may occur or that the transport claw may engage the unperforated portion of the film. Further, the second drive means is identical in operation and effect with the first drive means, except that the film transport claw 6a is engaged with a film perforation to transport the film in the reverse direction as long as the attraction of the electromagnet 23 moves the film transport claw 6a upwardly.

It will thus be apparent that the second, manually operable switch S2 and the fourth, manually operable switch S4 in the circuit of FIG. 11 are associated with each other so that these two switches may be opened simultaneously but may not be closed simultaneously and so, by alternatively closing one of them, for example, the second switch S2, the film may be transported in the forward direction, whereafter by closing the fourth switch S4, the film may be transported in the reverse direction without the rotation of the motor M being reversed.

Figure 15:
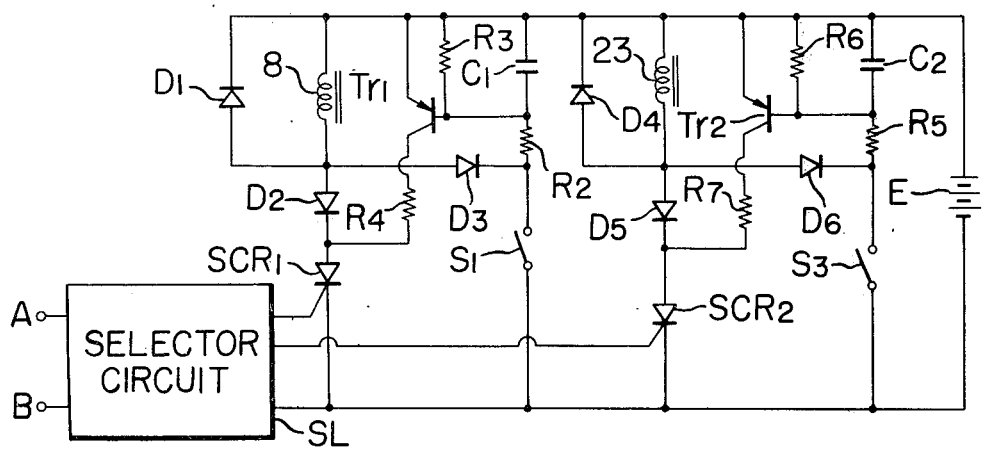
FIG. 15 is a feeder circuit diagram to electromagnet for employing a pulse signal.

In the above-described embodiment, the second and fourth manually operable switches S2 and S4 are used as extraneously operable switches, but FIG. 15 shows an embodiment in which film transport is effected in accordance with a pulse supplied from outside.

A serial connection of capacitor C1 and resistor R2 is connected to an electrical power source E through a first switch S1 comprising the above-described plate springs 17 and 18.

An electromagnet 8 is also connected to the power source E through an inverse current blocking diode D2 and a thyrister SCR1. A diode D1 is parallel-connected to the electromagnet 8 and serves to bypass the counter electromotive force of the electromagnet during cut-off of the current flow to the electromagnet 8.

A transistor Tr1 has its emitter connected to the power source, its base connected to the junction between the capacitor C1 and the first switch S1, and its collector connected to the anode of the thyrister SCR1 through a resistor R4. A resistor R3 is parallel-connected to the capacitor C1 to permit the capacitor to discharge therethrough. An inverse current blocking diode D3 is connected between the electromagnet 8 and the switch S1.

The capacitor C1, switch S1, resistors R2, R3, R4, diodes D1, D2, D3, electromagnet 8, thyrister SCR1 and transistor Tr1 together constitute a first control circuit for first drive means.

The capacitor C2, third switch S3, resistors R5, R6, R7, diodes D4, D5, D6, electromagnet 23, thyrister SCR2 and transistor Tr2 together constitute a second control circuit for second drive means, and these individual elements are connected in the same manner as those of the first control circuit, as shown.

Two types of reproduce pulses different in frequency, as from a tape recorder, or forward and reverse transport pulses comprising two different forms of carrier waves of 500 Hz and 2.5 KHz, for example, are supplied to terminals A and B.

These pulses are treated by a selector circuit SL for pulse discrimination or the like, whereafter the forward transport pulse is supplied as trigger pulse to the gate of the thyrister SCR1 while the reverse transport pulse is supplied as trigger pulse to the gate of the thyrister SCR2.

Description will now be made of the manner in which the forward transport pulse is continuously supplied to said gate at a time interval required for one-frame transport of the film.

If the end portion 7a of the pivotable plate 7 and the face cam 4 are in the relative position as shown in FIG. 12 and accordingly, the first switch S1 is open, and when the forward transport pulse is supplied to the gate of the thyrister SCR1, then the thyrister will conduct to permit a flow of current to the electromagnet 8. As a result, in FIG. 12, the lever 16 will immediately be attracted.

Thereafter, through the position of FIG. 14, the film will be transported by one frame. However, in the position of FIG. 14, if the first switch S1 is closed, all the current flowing through the electromagnet 8 will flow to the first switch S1 to render the thyrister SCR1 non-conductive. Upon closing of the first switch S1, the capacitor C1 will be charged to increase its terminal voltage, but the thyrister SCR1 will never fail to conduct upon closing of the first switch S1 because the electrostatic capacity of the capacitor C1 and the value of the resistor R3 are selected such that the terminal voltage of the capacitor C1 reaches a sufficient value to turn on the transistor TR1 only after the thyrister SCR1 has become non-conductive.

When, as described previously, the position of FIG. 12 is again attained after one-frame transport of the film, the first switch S1 will be opened to cut off the flow of current to the electromagnet 8. Thereafter, when a forward transport pulse is again supplied, the above-described operation will be repeated. Thus, supply of each one pulse results in one-frame transport of the film.

If, in the position of FIG. 13, a forward transport pulse is first supplied to the gate of the thyrister SCR1, then the thyrister will conduct to permit a flow of current to the electromagnet 8, whereas the lever 16 will not immediately be attracted but will be attracted only after the position of FIG. 12 has later been brought about by the rotation of the shutter shaft 1. Then, the position of FIG. 14 will be attained as already described, wherein the switch S1 is closed to render the thyrister SCR1 non-conductive so that the current to the electromagnet 8 will flow through the switch S1. After the closing of the first switch S1, the capacitor C1 will be charged, and after the thyrister SCR1 has become non-conductive, the transistor Tr1 will become ready to turn on and be maintained in ON state during the closing of the switch S1. If a next forward transport pulse is supplied when the end portion 7a remains in engagement with the recessed portion of the face cam 4, the thyrister SCR1 will conduct because the transistor Tr1 is in ON state, so that the current from the transistor Tr1 will flow to the thyrister SCR1 to maintain such state. Thereafter, one-frame transport of the film will occur and the shift from the position of FIG. 14 to the position of FIG. 12 will occur, whereupon the first switch S1 will be opened. After the opening of the first switch S1, however, the current through the electromagnet 8 will flow through the conductive thyrister SCR1 to permit the electromagnet 8 to continue to attract the lever 16 and thus, the position of FIG. 14 will again be attained to transport the film.

The above-described opeation will recur as long as the supply of forward transport pulse is continued. More specifically, the capacitor C1 and the transistor Tr1 serve as a kind of switch in that the transistor Tr1 becomes conductive after a time required from the closing of the first switch S1 till the thyrister SCR1 becomes non-conductive has passed, and thereafter renders the thyrister conductive upon supply of a pulse thereto and that the transistor Tr1 is non-conductive as long as the first switch S1 is open.

Thus, according to this circuit, whenever a forward transport pulse is supplied to the gate of the thyrister SCR1, one-frame transport of the film may be effected by that one pulse, irrespective of the then relative position of the face cam 4 and the end portion 7a.

The second circuit is entirely similar to the above-described first circuit.

As will be appreciated from the foregoing, the thyristor provides a power supply holding circuit for electromagnet which uses an input pulse as the set signal and one-frame transport operation as the reset signal and therefore, the thyrister may of course be replaced by an equivalent circuit or the like comprising a transistor or other element which will perform the same function as the thyrister. Further, it is possible to design the selector circuit SL of FIG. 15 such that, instead of reproduce pulse signals from tape recorder, pulse signals from repetitive timer of variable period are selectively supplied to the first and second circuits for instruction.

The present invention, as described hitherto, eliminates the impacts which have heretofore been imparted to the film transport claw during electromagnetic drive by the attracting and releasing movements of the electromagnet, and this results in very quiet operation of the transport claw. Also, the frame feed cycle may be varied within a wide range as in the conventional method using an electromagnet. Further, the present invention eliminates the need to provide timing for the initiation of the power supply to the electromagnet by the use of a mechanical or electrical arrangement as in the prior art, and ensures the frame feed to occur at a predetermined position of a scene at whatever time the power supply to the electromagnet may be initiated, thus avoiding occurrence of half-frame feed or movement of the transport claw toward unperforated portion of the film and also preventing the projection from being terminated during film transport. In addition, one-frame feeding operation may be effected by a pulse from a simple repetitive CR timer of variable period or a tape pulse reproduce circuit of a tape recorder and this leads to accuracy of the number of frames transported, which means a very great practical advantage.

Furthermore, the forward or the reverse transport of the film may be achieved by a single film transport claw simply through the selective power supply to two electromagnets and thus, the change of the film transport direction can be effected in a very short time.

Moreover, the timing for the selection of the power supply to the two electromagnets may be controlled in a very simple manner. Still furthermore, the number of film frames transported in the forward or the reverse direction may be made to exactly agree with the pulse number by discriminating between the forward transport pulse and the reverse transport pulse, and the frame transport in either direction may be accurately controlled in the unit of one frame by a reproduce pulse signal from tape recorder.

I claim:

1. An electromagnetically controlled film transport device comprising:
    1. a film transport member having at one end thereof a claw portion engageable with a film perforation, said film transport member being reciprocally movable in a film transport direction to transport a film and movable between a position in which said claw portion is engaged with a film perforation and a position in which said claw portion is retracted from the film perforation, said film transport member being biased to said latter position by a resilient member;
    2. a pivotable member adapted to assume a first position in the direction in which said transport member transports the film and to assume a second position in the direction opposite to said film transport direction;
    3. an electromagnet having a field member provided on one of said transport member and said pivotable member for attracting an attractable piece provided on the other of said two members, said electromagnet, when energized, uniting said two members together by its attraction to transmit the movement of said pivotable member to said transport member so as to cause said transport member to be moved into and out of engagement with the film perforation, said transport member being in engagement with the perforation when said pivotable member is in its first position as long as said transport pivotable members are united together by the attraction of said electromagnet, said transport member being retracted from the perforation when said pivotable member is in its second position;
    4. switching means for connecting said electromagnet to an electrical power source to energize said electromagnet; and
    5. a phase switch parallel-connected to said switching means and adapted to be closed as long as said transport member is in engagement with the perforation.

2. A device according to claim 1, wherein the distance $d_1$ between said field member and said attractable piece when said pivotable member is in its first position during non-energization of said electromagnet and the distance $d_2$ between said field member and said attractable piece when said pivotable member is in its second position is in the relation that $d_1 > d_2$, and the attraction of said electromagnet and the biasing force of said resilient member are selected such that said field member cannot attract said attractable piece thereto when the distance between said field member and said attractable piece exceeds $d_1$.

3. A device according to claim 2, wherein said switching means is a switching circuit series-connected to the winding of said electromagnet and adapted to become conductive in response to a pulse signal and the become non-conductive upon closing of said phase switch, and said device further comprises a memory circuit for memorizing entry of a pulse during film transport by continuing to supply a sufficient holding current to said switching circuit for said switching circuit to hold its conductive state from a point of time at which the pulse enters said switching circuit till the phase switch is opened to permit power supply to said electromagnet through said switching circuit so that, when the pulse has entered said switching circuit between the moment at which the phase switch is closed to render the switching circuit non-conductive and the time during which said phase switch remains closed, said electromagnet may be supplied with power through said switching circuit even after said phase switch is later opened.

4. A device according to claim 1, further comprising:
    1. a second pivotable member adapted to assume a second position when said pivotable member is in its first position and to assume a first position when said pivotable member is in its second position;

2. a second electromagnet having a field member provided on one of said film transport member and said second pivotable member for attracting an attractable piece provided on the other of said two members, said field member of said second electromagnet attracting thereto said attractable piece of said second electromagnet upon energization of said second electromagnet to thereby transmit the movement of said second pivotable member to said film transport member so that said film transport member is in engagement with a film perforation when said second pivotable member is in its first position and retracted from the film perforation when said second pivotable member is in its second position;
3. second switching means for connecting said second electromagnet to said power source to permit power supply to said second electromagnet; and
4. a second phase switch parallel-connected to said second switching means and adapted to be closed when said second pivotable member is in its first position and said film transport member is in engagement with the film perforation.

5. A device according to claim 4, wherein the distance $d'_1$ between said field member and said attractable piece of said first electromagnet when said first pivotable member is in its first position during non-energization of said first electromagnet and the distance $d'_2$ between said field member and said attractable piece of said first electromagnet when said first pivotable member is in its second position is in the relation that $d'_1 > d'_2$, and the attraction of said first electromagnet and the biasing force of said resilient member are selected such that said field member of said first electromagnet cannot attract said attractable piece thereto when the distance between said field member and said attractable piece exceeds $d'_1$, and wherein the distance $d''_1$ between said field member and said attractable piece of said second electromagnet when said second pivotable member is in its first position during non-energization of said second electromagnet and the distance $d''_2$ between said field member and said attractable piece of said second electromagnet when said second pivotable member is in its second position is in the relation that $d''_1 > d''_2$, and the attraction of said second electromagnet and the biasing force of said resilient member are selected such that said field member cannot attract said attractable piece thereto when the distance between said field member and said attractable piece exceeds $d''_1$.

6. A device according to claim 5, wherein said first switching means is a first switching circuit series-connected to the winding of said first electromagnet and adapted to become conductive in response to a pulse signal and to become non-conductive upon closing of said first phase switch, and said second switching means is a second switching circuit series-connected to the winding of said second electromagnet and adapted to become conductive in response to a pulse signal and to become non-conductive upon closing of said second phase switch, and wherein said device further comprises:

a first memory circuit for memorizing entry of a pulse during film transport by continuing to supply a sufficient holding current to said first switching circuit for said first switching circuit to hold its conductive state from a point of time at which the pulse enters said first switching circuit till the first phase switch is opened to permit power supply to said first electromagnet through said first switching circuit so that, when the pulse has entered said first switching circuit between the moment at which the first phase switch is closed to render the first switching circuit non-conductive and the time during which said first phase switch remains closed, said first electromagnet may be supplied with power through said first switching circuit even after said first phase switch is later opened, and a second memory circuit for memorizing entry of a pulse during film transport by continuing to supply a sufficient holding current to said second switching circuit for said second switching circuit to hold its conductive state from a point of time at which the pulse enters said second switching circuit till the second phase switch is opened to permit power supply to said second electromagnet through said second switching circuit so that, when the pulse has entered said second switching circuit between the moment at which the second phase switch is closed to render the second switching circuit non-conductive and the time during which said second phase switch remains closed, said second electromagnet may be supplied with power through said second switching circuit even after said second phase switch is later opened.

7. A device according to claim 6, further comprising a selector circuit for selectively applying a pulse signal to said first and second switching circuits.

* * * * *